Figure 1:
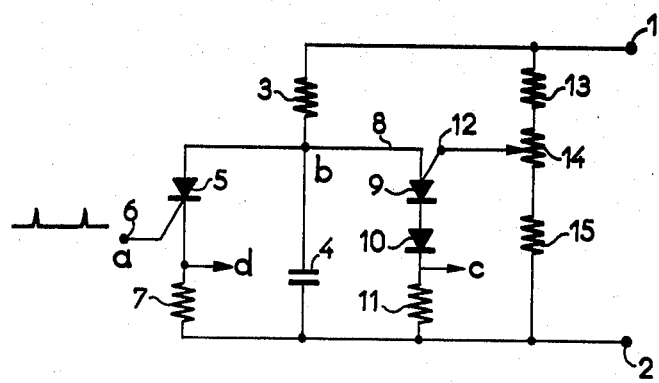

United States Patent [19]

Lombard

[11] 3,996,483
[45] Dec. 7, 1976

[54] MULTI-STATE SEMICONDUCTOR TACHOMETER CIRCUIT

[75] Inventor: Claude Lombard, Le Chesnay, France

[73] Assignee: Regie Nationale des Usines Renault, France

[22] Filed: Apr. 11, 1975

[21] Appl. No.: 567,204

[30] Foreign Application Priority Data

Apr. 16, 1974 France .................... 74.13179

[52] U.S. Cl. .................. 307/294; 307/228; 307/252 J; 307/246; 307/283; 307/233 R
[51] Int. Cl.² ............... H03K 17/28; H03K 17/56
[58] Field of Search .......... 307/228, 233 A, 233 B, 307/233 R, 271, 283, 246, 284, 252 J, 294

[56] References Cited
UNITED STATES PATENTS

| | | | |
|---|---|---|---|
| 3,033,994 | 5/1962 | Fujimoto et al. .................. 307/228 |
| 3,372,683 | 3/1968 | Phillips et al. .................. 307/284 X |
| 3,567,969 | 3/1971 | Goode et al. .................. 307/247 X |
| 3,704,382 | 11/1972 | Huntzinger .................. 307/271 |

*Primary Examiner*—John S. Heyman
*Attorney, Agent, or Firm*—Beveridge, DeGrandi, Kline & Lunsford

[57] ABSTRACT

A tachometer circuit in accordance with the invention has two or more output states dependent upon the frequency of an applied signal. The tachometer circuit is of the type comprising at least one time-measurement circuit having two discharge paths for a capacitor which forms part of a time-constant network. One of the discharge paths is controlled by the applied signal and the other path is caused to conduct after a predetermined time. In the circuit of the present invention the discharge path to which the input signal is applied includes a thyristor or like element with a high holding current which ensures a non-controllable discharge of the capacitor, and the other discharge path comprises a unijunction transistor or like element with a low holding current.

5 Claims, 7 Drawing Figures

MULTI-STATE SEMICONDUCTOR TACHOMETER CIRCUIT

This invention relates to a multi-state semiconductor tachometer circuit which operates by the comparison of the duration of one period of an incident signal with the duration of a signal provided by a time-constant circuit.

Numerous circuits of this type are known, and are utilised in the control mechanisms of vehicles or engines, to emit orders based on the speed of rotation of a shaft, or on a frequency which is generated or received on board the vehicle. Such circuits are particularly used when it is necessary to obtain dead regions between two contrary orders, for example in order to construct simplified servomechanisms, e.g. for controlling the speed of a vehicle or of an engine, for controlling the gearbox, or the position of the headlamps, or operating hydraulic control jacks, etc. The more usual of these circuits effect the integration of a voltage pulse released at each period of the incident signal, while other circuits count a certain number of incident signals during a fixed time.

These known circuits have the disadvantage of generating their orders only after a certain number of incident signals. On the other hand, certain other tachometer circuits, particularly that described in French Patent Specification No. 1,457,550 deposited by the Applicant on Sept. 10, 1965 under the title "Governor for control as a function of frequency and of at least one auxiliary parameter", the equivalent of which is U.S. Pat. No. 3,403,587, does not suffer this disadvantage.

The device of the above-mentioned patent is based on the comparison of the duration of a signal provided by a time constant circuit associated with a unijunction transistor with the duration of a period of an incident signal. According as to whether the period of the incident signal is greater than or less than the duration of the reference signal, a pulse of high value is transmitted via one or other trigger path of a bistable circuit, which stores the result until the following period. It will be noted that such a circuit gives results very superior to those of other circuits, subsequently developed, in which the unijunction is followed by voltage response circuits, because their response is slower, and problems of temperature compensation are more difficult to overcome. It will likewise be noted that the circuit described in the above-mentioned French patent specification is not limited to a particular type of unijunction transistor: it is sufficient, in fact, that rapid firing is produced for a triggering voltage which is well-established with respect to the voltage applied to the other electrodes. As only the first rise of voltage is utilised, the characteristic period obtained is independent of the valley voltage and current of the unijunction transistor.

The above-mentioned French patent specification likewise cities the case of several circuits controlled in parallel, but with different time constants. However, when two actions are to be produced at frequencies between which there is only a small difference, it is necessary to use high-stability passive elements to constitute the time-constant circuits, as otherwise the difference between the two actions cannot be maintained after a certain time of operation.

An object of the present invention is to provide an improvement of the previously-mentioned circuit, and its extension to a device which has two or more states as a function of a period of the incident signal.

According to the present invention, a tachometer circuit with two or more output states dependent upon incident frequency comprises at least one time-measuring cell of the type with two discharge paths for a capacitor which forms part of a time-constant network, one of the discharge paths being controlled by the incident signal, and the other path being a path with spontaneous conduction after a fixed time, in which the discharge path subjected to the incident frequency comprises a thyristor-type device with a high holding current, ensuring a non-controllable discharge of the capacitor, and the other discharge path comprises a unijunction transistor-type device with a low holding current.

When the tachometer circuit comprises several time-measuring cells of the above-mentioned type or a type having similar effects, one of the time constants is caused to start only after the end of the preceding one. The precision of the separation thus depends only on the precision of the time constant under consideration, and not on the difference between the time constants.

Figure 2:
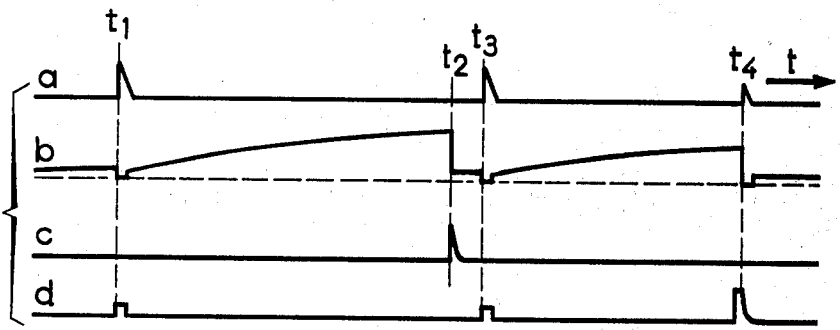
Figure 4:
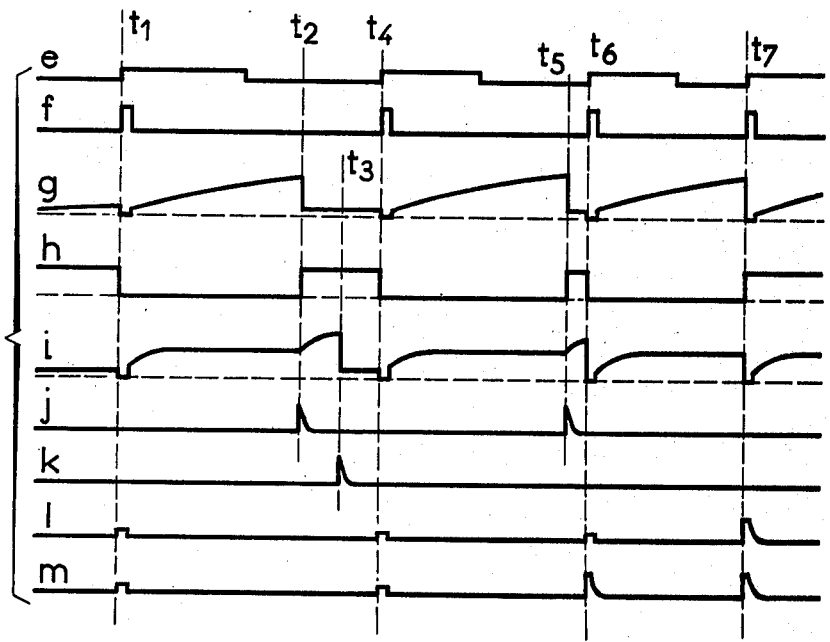
Figure 3:
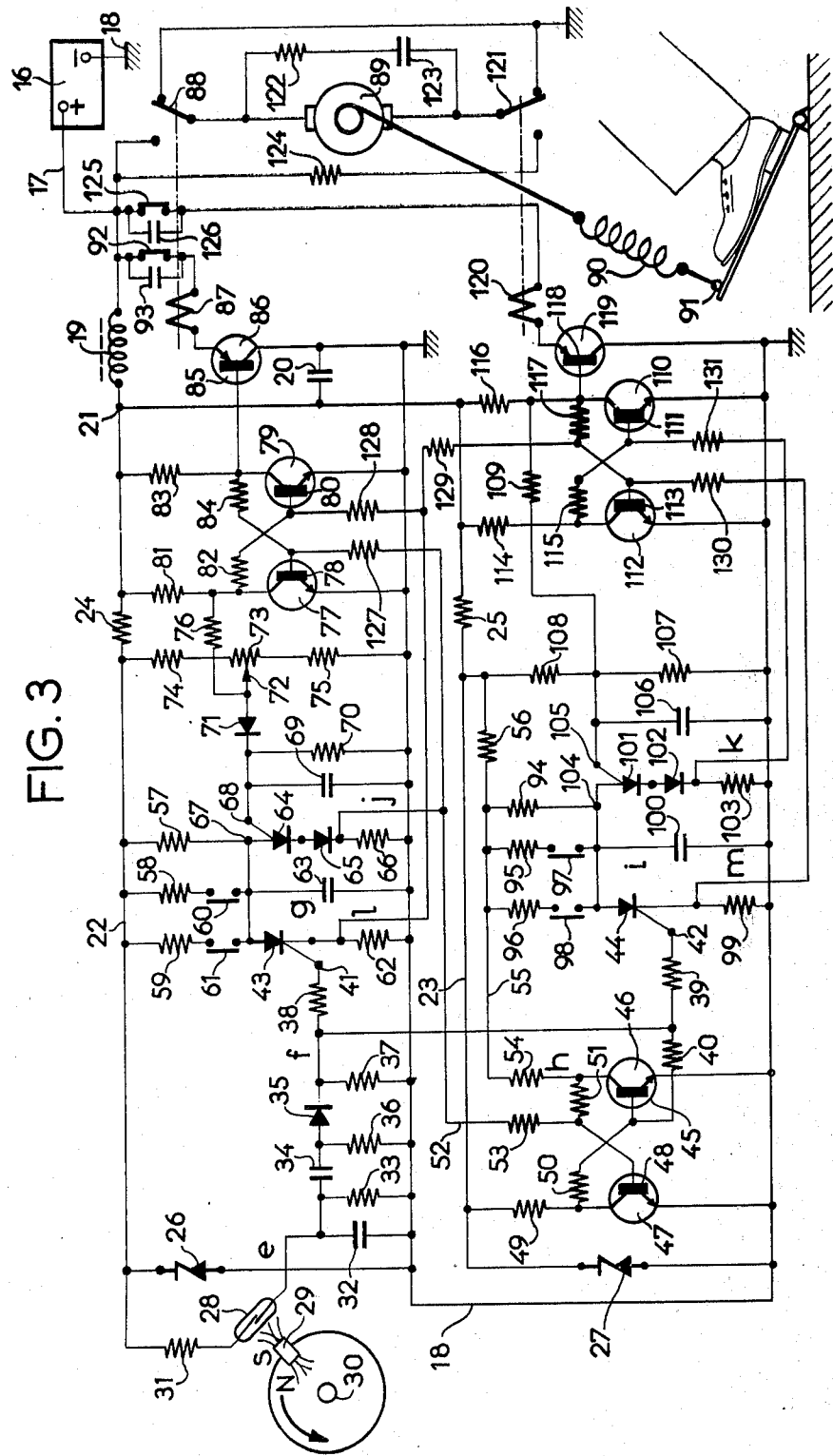
Figure 5:
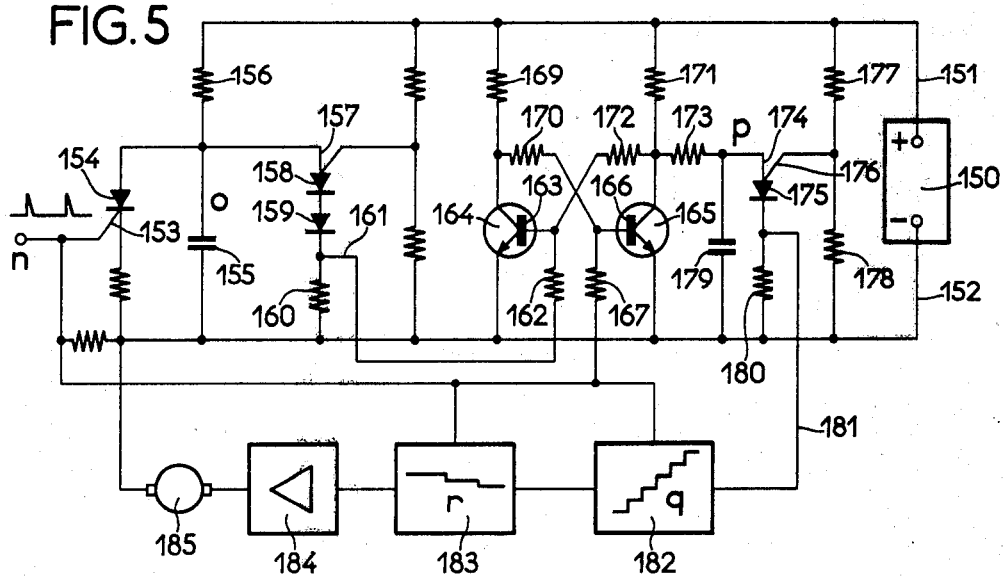
Figure 6:
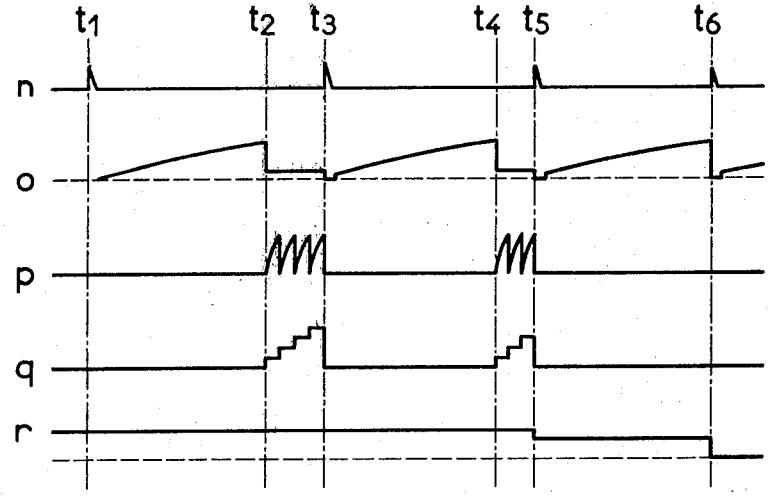
Figure 7:
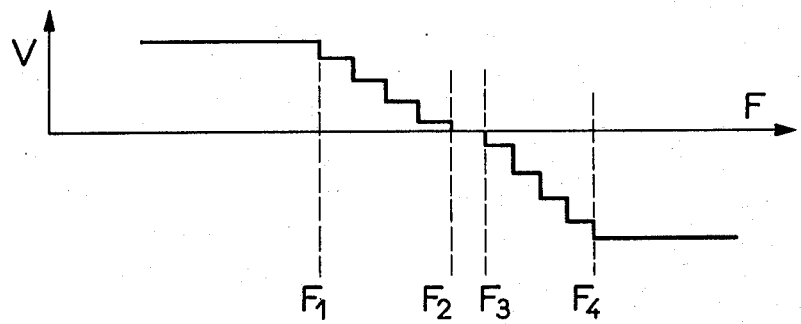

The invention will be better understood with the aid of the following detailed descriptions of several embodiments, taken as non-limitative examples, illustrated by the accompanying drawings, in which:

FIG. 1 is a schematic diagram of a basis tachometer circuit according to the invention, which circuit generates pulses on one or other control path according to whether the incident period is longer or shorter than the reference time constant, FIG. 2 is a diagram of the waveforms obtained in the FIG. 1 circuit with an incident signal with a long period shown in the lefthand part of the Figure, and a short period in the righthand part of the Figure, FIG. 3 is a schematic circuit diagram of a tachometer circuit with three states, responding to the frequency of closing of a contact, FIG. 4 is a diagram of the waveforms obtained at various points in the circuit of FIG. 3, at the left of the Figure for a long incident period, at the middle of the Figure for a medium length period, and at the right of the Figure for a short period, FIG. 5 is a schematic circuit diagram of a control device with $n$ states, particularly permitting a stepwise progressive control to be obtained on either side of a dead region enclosing the control value to be attained, FIG. 6 is a diagram of the waveforms and the states of the circuit of FIG. 5 as a function of time, and FIG. 7 is a diagram explaining how the output control states vary as a function of the incident period of the embodiment described with reference to FIGS. 5 and 6.

The circuit shown in FIG. 1 comprises a positive supply line 1 and a negative line 2. A resistor 3 is connected at one end to the line 1 and is connected in series with a capacitor 4 whose other end is connected to the line 2. The resistor 3 and the capacitor 4 constitute the time-constant circuit. Two separate circuits are connected in parallel with the capacitor 4. The first of these circuits comprises a thyristor 5 having a trigger gate 6. This thyristor is connected in series with a resistor 7 to the negative line 2. The trigger gate 6 of the thyristor 5 receives the incident signal the variations of which are to be detected, this signal occurring in the form of repeated short pulses.

The second circuit connected in parallel with the capacitor 4 is composed of a unijunction transistor 9 the anode 8 of which is connected to the common point of the resistor 3 and the capacitor 4, and the cathode of which is connected via a resistor 11 to the negative line 2. The trigger electrode or second base 12 of the unijunction transistor 9 is connected to a potential divider connected between the lines 1 and 2 and composed of three resistors 13, 14 and 15. The central resistor 14 comprises a potentiometer the slider of which is connected to the second base 12, thus enabling the voltage applied to this electrode 12 to be adjusted.

In this embodiment, the semiconductor element 5 is a thyristor, but it may be any element the conduction of which can be initiated by a triggering electrode and does not cease as long as the current passing through it does not fall below a minimal value known as the holding current.

In the same way, the semiconductor 9, which is here a unijunction transistor, is an element which has a behaviour similar to that of the thyristor but with the difference that conduction is only produced for a certain level of relative potential between the electrodes 8 and 12.

The operation of the circuit of FIG. 1 will now be described with reference also to the diagram of FIG. 2, which shows the development, as a function of time, of the voltages at various points of the circuit of FIG. 1, these points being respectively marked $a$, $b$, $c$, $d$.

At the point $a$ there is shown the signal incident at the gate 6, the variations of which initiate the orders to be emitted by the circuit. With each positive pulse, the thyristor 5 discharges the capacitor 4 and extinguishes the unijunction transistor 9 if the latter has been fired. The presence of the diode 10 increases the fall of potential in the series circuit which includes the transistor 9 and is connected to the terminals of the capacitor 4. The discharge current of the capacitor 4 is therefore diverted towards the thyristor 5. After discharge of the capacitor 4, the thyristor 5 ceases to conduct because the resistor 3 does not deliver a current sufficient to keep the thyristor fired. By way of non-limiting examples, the holding current of the thyristor can be between 1 and 100 milliamps, while the holding current of the unijunction transistor is in general 100 times smaller. It is thus easy to choose for the resistor 3 a value which keeps the unijunction transistor 9 fired while the thyristor becomes extinguished. This operation will be seen in more detail below.

At the end of a very short time interval starting at $t_1$, the thyristor 5 and the unijunction transistor 9 are no longer conductive. The charge of the capacitor (curve $b$) increases with time via the resistor 3. If the interval between $t_1$ and $t_3$ is sufficient, the unijunction transistor will fire at $t_2$, causing a high amplitude pulse on the terminals of the resistor 11 to appear at the point $c$, which is the common point of the diode 10 and the resistor 11; but after discharge of the capacitor 4, the unijunction transistor 9 will remain conductive, since the resistor 3 has been chosen to this end. The capacitor 4 will therefore remain practically discharged, and at the instant $t_3$ firing of the thyristor 5 will cause to appear at $d$, on the terminals of the resistor 7, only a very small pulse corresponding substantially to the threshold value of direct voltage of the diode 10.

The cycle then repeats, but if the interval of time between $t_4$ and $t_3$ is less than the interval $t_2 - t_1$ needed for firing the unijunction transistor, the thyristor 5 will discharge the highly-charged capacitor 4 at the instant $t_4$ and a considerable pulse will appear at the point $d$.

It will thus be seen that considerable signals will appear at $c$ or at $d$ according to whether the incident period is longer or shorter than the firing period. These signals are utilised for developing the commands of the control mechanisms (not shown).

The principle of operation of a circuit with two discharge paths was already known from the French Patent Specification No. 1,457,550 previously mentioned, but the replacement of the element subjected to the incident signal by the thyristor 5, ensuring the discharge of the capacitor 4 whatever the duration of the trigger signal, and the addition of the diode 10, have enabled the limits of use of the circuit to be extended by a ratio of between 10 and 1000 as regards values of resistance, voltage, etc., giving this circuit a more industrial character.

FIG. 3 is a diagram of a three-state tachometer circuit responding to the frequency of closing of a pair of contacts. Without departing from the scope of the invention, the signal could be provided by any other emitter provided that a repetition of signals can be distinguished. Such a circuit could, by way of non-limiting example, serve to control the setting in motion to left or right of an electric motor or of an equivalent device, particularly for regulating the speed of a vehicle, acting under the control of the accelerator.

There is shown in FIG. 3, to enable the scope of it to be better understood, the symbolic control of a raiser of a vehicle accelerator pedal by means of an electric motor with two senses of rotation, but this scope is not limited to this sort of application and covers the control of jacks to apply force, the control of gearboxes, of correction of the position of headlights, etc.

In FIG. 3, the main vehicle supply is fed by a battery 16 the positive output of which is connected to a line 17 and the negative output of which is connected by a line 18 to the general earth. The line 17 is connected to a lossy ferrite inductance 19 which filters the parasitics from the vehicle main supply in cooperation with a capacitor 20 which decouples the output 21 to the general earth. This output 21 feeds two measuring paths, the main one, at the top of the Figure, providing the first measuring period starting from the beginning of the incident signal, and the secondary measuring path, situated at the lower part of the Figure, providing a second measuring period starting at the end of the first. The main parts of each of the two measuring paths are fed with regulated voltage on lines 22 and 23 obtained via resistors 24 and 25, respectively, from the output 21, each line 22 and 23 being connected to a respective zener diode 26 and 27, returned to the common earth.

A magnetic switch 28 whose alternate periods of opening and closing form the incident signal of the measuring circuit, is subjected to the influence of a rotating magnet 29 which turns about an axis 30, which is for example an output shaft of the gearbox of the vehicle. One side of this switch 28 is fed from the line 22 via a resistor 31. The other side of the switch 28, marked by the letter $e$, is connected to the common earth by an anti-parasitic capacitor 32 and by a resistor 33 which serves to establish an output voltage. To the same point $e$ there is also connected a capacitor 34 which is in series a diode 35 which ends at a point marked by the letter $f$. These points $e$ and $f$ are points at which are measured voltages which are shown in FIG. 4.

A resistor 36 connects the junction point of the capacitor 34 and the diode 35 to the earth line 18, while another resistor 37 is connected in parallel with the output of the diode 35. The elements 28 to 37 together constitute a generator circuit for rectangular signals followed by a differentiator and a suppressor of negative polarity. The resistor 31, which feeds the switch 28 from the positive line 22, prevents accidental damage to the switch 28 in case of a wiring fault. The circuit composed of the elements 28, 31, 32, 33, 34 and 36 is a known circuit which is only described as an example of a practical application of the device according to the invention.

Three resistors 38, 39 and 40 connected to the point $f$ respectively feed control gates 41 and 42 of thyristors 43 and 44, respectively, and the base 45 of a transistor 46 which constitutes, with another transistor 47, a bistable flip-flop. The transistor 47 has a base 48.

The collector of the transistor 47 is connected to the line 23 via a resistor 49, and to the base 45 of the transistor 46 by a resistor 50. The base 48 of the transistor 47 is connected to the collector of the transistor 46 by a resistor 51, and to a line 52 by a resistor 53. A resistor 54 is connected to the collector of the transistor 46 and is connected to a line 55 which rejoins the line 23 via a resistor 56. The collector of the transistor 46 is a point of voltage measurements, marked $h$.

Returning to the main measurement path at the upper part of FIG. 3, it is seen that the anode of the thyristor 43 is connected to the line 22 via resistors 57, 58, 59, the last two being respectively connected via switches 60 and 61. The cathode of the thyristor 43 is connected to the earth line 18 via a resistor 62, the output at the terminals of this resistor being marked $i$. In parallel with the series circuit formed by the thyristor 43 and the resistor 62, there are connected a capacitor 63 and another series circuit formed by a unijunction transistor 64, a diode 65 and a resistor 66, the anode and the trigger electrode of the unijunction transistor being respectively referenced 67 and 68. The voltage output at the terminals of the resistor 66 is referenced $j$. Between the trigger electrodes 68 of the unijunction transistor 64 and the earth line 18 there are connected in parallel a capacitor 69 and a resistor 70 for eliminating parasitics and establishing an output voltage, while a diode 71 is connected between the trigger electrode 68 and the slider 72 of a potentiometer 73 which constitutes, with resistors 74 and 75, a voltage divider between the positive line 22 and the earth line 18. The diode ensures temperature compensation of the unijunction transistor. A resistor 76 is connected to the slider 72 and to the collector of a transistor 77 having a base 78, which transistor constitutes with another transistor 79 a bistable flip-flop. The transistor 79 has a base 80.

A resistor 81 is connected between the collector of the transistor 77 and the line 21, and a resistor 82 connects the collector of the transistor 77 to the base 80 of the transistor 79. Similarly, the collector of the transistor 79 is connected to the line 21 via a resistor 83, and to the base 78 of the transistor 77 via a resistor 84. The collector of the transistor 79 is also connected to the base 85 of a PNP transistor 86, the collector of which is directly connected to the earth line 18. The emitter of the transistor 86 is connected to the positive line 17 by way of the excitation coil 87 of a relay which has a change-over switch 88 controlling one input of a motor 89 which drives, via an elastic element 90, an accelerator 91 of the vehicle, to raise or lower the accelerator. A limit of travel contact 92 of the motor is connected in series with the excitation coil 87. Its parasitics are suppressed by a capacitor 93 in parallel therewith.

The secondary measuring path is constituted in a similar manner to the main measuring path, apart from a few details.

The anode of the thyristor 44 is connected to the line 55 by a resistor 94 in parallel with which can be respectively connected the resistors 95 and 96 via switches 97 and 98, which are closed at the same time as the switches 60 and 61 respectively. The cathode of the thyristor 44 is connected to the common earth line 18 via a resistor 99, the measurement point of voltage at its terminals being referenced $m$. The discharge capacitor of this second circuit is referenced 100 and its measurement point is $i$; the unijunction transistor is referenced 101, the diode 102 and its resistor 103, the voltage measurement point at the terminals of which is marked $k$. The anode and the trigger electrode of the unijunction transistor 101 are respectively referenced 104 and 105. The trigger electrode 105 is connected to the earth line 18 via a parallel circuit comprising a capacitor 106 and a resistor 107 constituting with a resistor 108 a potential divider across the voltage on the line 23. For economy, there have been omitted from this second measuring circuit a diode equivalent to the diode 71 of the first circuit, and also a potentiometer equivalent to the potentiometer 73, because the characteristic period of the lower circuit is small in relation to the characteristic period of the upper circuit and does not require very great precision.

A resistor 109 is connected to the trigger electrode 105 and to the collector of a transistor 110 having a base 111, which transistor constitutes with a transitor 112, having a base 113, a bistable flip-flop. The collector of the transistor 112 is connected via a resistor 114 to the line 21 and via a resistor 115 to the base 111 of the transistor 110, which the base of this transistor 110 is connected via a resistor 116 to the line 21 and via a resistor 117 to the base 113 of the transistor 112. The collector of the transistor 110 is directly connected to the base 118 of a PNP transistor 119, the collector of which is directly connected to the earth line 18 and the emitter of which is connected to the line 17 via an excitation coil 120 of a relay. The relay has a changeover switch 121 which controls the other input of the motor 89. The two relays with excitation coils 87 and 120 permit rotation of the motor 89 to the right or to the left, and also stopping of the motor. This motor is shunted by a resistor 122 in series with a capacitor 123, to provide suppression of its parasitics. A resistor 124 connects, via the changeover switch 121, the second input of the motor 89 to the line 17, the presence of the resistor 124 causing the pedal 91 to descend more slowly than its rise. A limit of travel switch 125 is connected in series with the excitation coil 120, and is protected by a parallel capacitor 126.

Returning to the connections between the two measurement paths, it will be seen that the line 52 is connected to the resistor 66 at the point $j$, as well as to the base 78 of the transistor 77 via a resistor 127, and to the base 48 of the transistor 47 via a resistor 53. The transistors 47 and 77 are thus subjected to the signals provided by the unijunction transistor 64.

In the same way, the measurement point $l$ at the resistor 62 is connected to the base 80 of the transistor 79 via a resistor 128 and to the base 113 of the transistor 112 by a resistor 129. The transistors 79 and 112 are thus subjected to the signals emitted by the thyristor 43.

The measurement point m at the resistor 99 is connected to the base 113 of the transistor 112 by a resistor 130. The transistor 113 is thus likewise subjected to the signals from the thyristor 44. The measurement point k at the resistor 103 is connected to the base 111 of the transistor 110 by a resistor 131. The transistor 110 is thus subjected to the signals from the unijunction transistor 101.

Finally, it will be noted that all the transistors of the three bistable flip-flops previously mentioned are of NPN type while, as already mentioned, the transistors 86 and 119 are of the PNP type.

The operation of the circuits of FIG. 3 will now be briefly described with the aid of FIG. 4, which is a diagram showing the voltages, as a function of time, at the different measurement points which have been referred to in the description. The basic operation with two discharge paths for each capacitor having been described with reference to the circuit of FIG. 1, will not be repeated in detail.

Each closing of the switch 28, showing symbolically at e, results in the production, at the measurement point f, of a positive pulse beginning at the instants, $t_1$, $t_4$, $t_6$ and $t_7$, rendering conductive the thyristors 43 and 44 and the transistor 46. The voltage on the line 55 is only a fraction of the voltage on the line 23. The resistors 54 and 56 are chosen so as not to permit, in any case, the firing of the unijunction transistor 101 when the transistor 46 is conductive.

When conduction ceases, immediately after the instant $t_1$ the capacitors 63 and 100 are discharged, and all the semiconductor devices 43, 44, 64 and 101 are extinguished, but the transistor 46 remains conductive as long as the transistor 47 is not conductive.

The capacitors 63 and 100 are charged via a respective one of the resistor networks 57 to 59 and 94 to 96, but the charging of the capacitor 100, although rapid, is limited as a result of insufficiency of voltage on the line 55, as can be seen from the diagram of the voltage at the point i, while the charging of the capacitor 63, measured at the point marked g, follows its course as far as the firing of the unijunction transistor 64 at the instant $t_2$, when it emits a pulse through the resistor 66 at the point marked j, rendering the transistor 77 conductive if it is not already so, and rendering conductive the transistor 47, which blocks the transistor 46 and causes the voltage on the line 55 to rise again to near the voltage existing on the line 23. The charging of the capacitor 100 then takes place as can be seen from its curve at the measurement point i, rendering conductive, at the instant $t_3$, the unijunction transistor 101, which causes a pulse to appear at the terminals of the resistor 103, at the measuring point k, this renders the transistor 110 conductive.

Since the transistor 77 is conductive from the instant $t_2$, it has at least blocked the transistors 79 and 86. In the same way, the conduction of the transistor 110 results in conduction of the transistor 119 and the closing of the relay, the excitation coil of which is 120. The motor is thus fed from the supply line and lowers the pedal 91 until the period of the incident signal shortens or the end of travel switch 125 opens. In fact, when the period of the signal produced by the switch 28 is long, this means that the speed of the vehicle is too low, and it is thus appropriate to permit the acceleration of the vehicle.

Starting at the instant $t_4$, it is supposed that the speed of the shaft 30 increases. The same process is only found starting from the instant $t_1$, but if the unijunction transistor 64 can fire normally at the instant $t_5$, confirming the conduction of transistor 77 and rendering conductive the transistor 48, the closure of the switch 28 occurs at the instant $t_6$, before the firing of the unijunction transistor 101.

At the instant $t_6$ a substantial pulse thus appears at the terminals of the resistor 99, at the measurement point marked m, and this results in the conduction of the transistor 112 and blocking of the transistor 110 and 119 as well as the suppression of the current in the excitation coil 120. The motor 89 will thus no longer be energised, and will stay in its present position, supposing that the connection with the pedal 91 is irreversible.

If the speed of the shaft 30 further increases, the instant $t_7$ will take place before the firing of the unijunction transistor 64; that is to say, an energy pulse will appear on the resistor 62 at the measuring point marked l, which will result in conduction of the transistor 79 and of the transistor 86. Current will flow in the excitation coil 87, causing changeover of the switch 88. The motor will thus be fed with high voltage and will turn in the sense for rapid lifting of the accelerator, which is the desired effect since at this moment the speed of the vehicle is excessive.

The speed of the vehicle will thus diminish until a degree of stabilisation is attained, this speed persisting such that the firing of the unijunction transistor 101 occurs between two closures of the switch 28.

Operation in three stages has thus been obtained. It will be noted that the time of calculation is at most equal to a period of the switch 28. The circuit thus has the advantage of rapidity relative to those which perform the integration of several input signals.

Precharging of the capacitor 100 from the line 55 is necessary, as without this arrangement, when an instant such as $t_6$ comes too close to $t_5$, the voltage at the terminals of the capacitor 100 would be near zero in the absence of precharging, and the signal appearing at the point m would be very small at an instant $t_6$. It could be insufficient to guarantee, at each period, conduction of the transitor 112, so that risks of abnormal operation in a parasitic environment, or in the case of accidental interruption of the feed, could arise.

The extension of the basic circuit to n-state logic will now be described with the aid of FIGS. 5, 6 and 7, and will be described by way of a non-limitative example, in the case concerned with causing a control element to turn to right or to left, forward or backward, by successive steps as a function of the period of the input signal.

In the schematic diagram of FIG. 5, a source of direct current 150 has a positive output line 151 and a negative output line 152. Periodic pulses are applied to the gate 153 of a thyristor 154. This gate constitutes a measuring point marked n, and the corresponding diagram, as a function of time, is to be found in FIG. 6. The anode of the thyristor 154 is connected to a capacitor 155 as well as to a charging resistor 156 and to the anode 157 of a unijunction transistor 158 the cathode of which is connected to the line 152 via a series circuit comprising a diode 159 and a resistor 160. The point common to the diode 159 and the resistor 160 is connected via a line 161 and a resistor 162 to the base 163 of a transistor 164. This transistor constitutes, with another transistor 165 having a base 166, a bistable flip-flop. The base 166 of the transistor 165 is connected via a resistor 167 to the gate 153 of the thyristor 154 and likewise receives the input signal. The collector of the transistor 164 is connected by a resistor 169 to the line 151, and by a resistor 170 to the base 166 of the transistor 165. The collector of the transistor 165 is connected by a resistor 171 to the line 151, and by another resistor 172 to the base 163 of the transistor 164. The collector of the transistor 165 is also connected by a resistor 173 to the anode 174 of a unijunction transistor 175, the trigger electrode 176 of which is connected to a voltage divider comprising two resistors 177 and 178 connected in series between the lines 151 and 152. A capacitor 179 is connected between the anode 174 of the thyristor 175 and the line 152. This capacitor constitutes, with the resistor 173, the time-constant circuit associated with the unijunction transistor 175. A resistor 180 connects the cathode of the unijunction transistor 175 to the line 152.

The voltage across the resistor 180 is fed by a line 181 to a counter 182, which is of the linear type or otherwise, which counter is connected to a memory device 183 controlling an amplifier 184 the output of which is connected to an actuator 185. The input signal fed to the point $n$ is also fed to the counter 182 and to the memory 183 to control their cyclic action. The trigger electrode of the unijunction transistor 158 is fed in the usual manner by a voltage divider, not further described in detail.

The operation of the circuit shown in FIG. 5 will now be described in summary with the aid of FIG. 6 and then with FIG. 7.

In FIG. 6, which shows the voltage at different points of the circuit as a function of time, there will be seen the curve marked $n$ which corresponds to the voltage applied to the gate 153 of the thyristor 154 and having periodic pulses at instants $t_1$, $t_3$, $t_5$ and $t_6$. The curve of the voltage at the terminals of the capacitor 155, labelled $o$, shows periodic charging beginning at $t_1$ and ending at $t_2$, with a discharge through the unijunction 158 which causes the transistor 164 to conduct. This in turn blocks the transistor 165 and permits the resistor 173 to charge the capacitor 179 until firing of the unijunction transistor 175 occurs. The resistor 171 is chosen such that the unijunction transistor 175 does not remain conductive but strikes periodically, as is usually the case. The voltage obtained at the anode 174 of the unijunction transistor 175, at the measuring point labelled $p$, is shown in FIG. 6. The pulses applied to the line 181 are accumulated in the counter 182 and are shown in diagram $q$ of FIG. 6. These pulses are transferred in the next cycle to the memory 183, the output voltage of which is shown in the diagram $r$ in FIG. 6, in such a manner that this memory causes to appear at the moment only the highest preceding state of counting.

At the instant $t_3$ or $t_5$ or also $t_6$, firing of the unijunction transistor 175 is stopped by the rendering of the transistor 165 conductive under the action of the incident signal at the point $n$.

If the circuit of FIG. 5 is applied to a device of the coarse servo-mechanism type taking, for example, a dead zone representing two or more counting intervals, the end result will be a voltage applied to the actuator 185, varying in the manner shown in FIG. 7 for different frequencies $f1, f2, f3, f4$ of the signal applied at $n$ to the gate 153.

Given that the incident signal is likewise applied directly to the base 166 of the transistor 165 via the resistor 167, and also to the counter 182 and the memory 183, only a single advantage is obtained in relation to the case where this signal was taken at the level of the cathode resistance of the input thyristor 154, as in the preceding FIGS.; and this in the case where the incident period is able to become, apart from regulation, extremely short with respect to that of the capacitor 165 associated with the unijunction 158. In this case, in fact, the voltage at the terminals of the capacitor 155 can become too small to give an appreciable pulse at the terminals of the cathode resistance of the input thyristor.

Another solution would be to effect a very rapid precharging of the capacitor 155 after each incident signal, for example by shunting a part of the resistor 156 with a zener diode.

I claim:

1. A tachometer circuit which receives a repetitive pulse input signal and provides two different output signals, powered by a D.C. power supply, and comprising:

a time-constant network comprising a first resistor and a capacitor connected in series with each other, the series combination being connected across the terminals of said power supply;

a first discharge path connected in parallel with the capacitor of said time-constant network and comprising the anode-cathode path of a thyristor connected in series with a second resistor, the gate of said thyristor being supplied with said input signal, and the first of said different output signals being outputted from the terminals of said second resistor;

a second discharge path also connected in parallel with said capacitor and comprising the anode-cathode path of a unijunction transistor (UJT) in series with a diode and a third resistor, the control electrode of said UJT being connected to a variable voltage dividing resistor circuit which is in turn connected across the terminals of said power supply, and the second of said output signals being outputted from the terminals of said third resistor, said first resistor having a resistance value which is sufficient for keeping said UJT fired when said thyristor becomes extinguished.

2. A tachometer circuit as claimed in claim 1 including a bistable multivibrator having first and second control inputs, means for providng the first control input thereof with said first output signal, and means for providing the second control input thereof with said second output signal.

3. A tachometer circuit receiving an incident pulse signal and providing at least three output states as a function of the frequency of said incident pulse signal, and comprising:

a first measurement circuit having two discharge paths, one path including a thyristor and the other path including a unijunction transistor, and having a first discharge capacitor, a bistable multivibrator connected at the input signal terminal of a second measuring circuit, also having two discharge paths, one including a thyristor, and the other including a unijunction transistor, and having a second discharge capacitor, means connected between said bistable multivibrator and said first measurement circuit and causing said bistable multivibrator to change state by said incident pulse signal and to return to its initial state by the firing of the unijunction transistor of said first measurement circuit, means connected between the capacitor of said second measuring circuit and a power supply for causing the precharging of said capacitor during the charging period of the capacitor of said first measuring circuit, output bistable multivibrators connected to the outputs of each of said measuring circuits for storing the outputs emitted, and combining means connected with said output bistable multivibrators, and arranged to obtain at least three output states as a function of the frequency of said incident pulse signal.

4. A tachometer circuit as claimed in claim 1 and including:

a bistable multivibrator controlled by the output signals of each discharge path, a series resistor-capacitor circuit fed by an output of said bistable multivibrator, a series circuit including a UJT and a resistor connected across the capacitor of said resistor-capacitor circuit, a counter connected to the node point of said UJT and resistor for accumulating the pulses of said UJT, a memory connected to said counter for displaying the state thereof, an amplifier connected to said memory, and means connected to the output of said amplifier for displaying a state or correcting it.

5. A tachometer circuit as claimed in claim 1 and including:

means for controlling the position of the accelerator of a vehicle as a function of the speed of rotation of a shaft, and means for annulling all displacements other than those carried out voluntarily by the driver of the vehicle in at least one of the states.

* * * * *